United States Patent
Jain et al.

(10) Patent No.: US 12,124,793 B2
(45) Date of Patent: Oct. 22, 2024

(54) SYSTEM AND METHOD FOR AUTO FILLING FORM FIELDS BASED ON NATURAL LANGUAGE PROCESSING

(71) Applicant: RAKUTEN SYMPHONY, INC., Tokyo (JP)

(72) Inventors: Raja Jain, Tokyo (JP); Tapas Ranjan, Tokyo (JP)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/012,517

(22) PCT Filed: Nov. 8, 2022

(86) PCT No.: PCT/US2022/049317
§ 371 (c)(1),
(2) Date: Dec. 22, 2022

(87) PCT Pub. No.: WO2024/102121
PCT Pub. Date: May 16, 2024

(65) Prior Publication Data
US 2024/0242020 A1    Jul. 18, 2024

(51) Int. Cl.
*G06F 40/174* (2020.01)
*G06F 40/20* (2020.01)
(Continued)

(52) U.S. Cl.
CPC ............ *G06F 40/174* (2020.01); *G06F 40/20* (2020.01); *G06F 40/40* (2020.01); *H04L 41/5074* (2013.01)

(58) Field of Classification Search
CPC ........ G06F 40/174; G06F 40/20; G06F 40/40; G06F 40/30; H04L 41/5074
See application file for complete search history.

(56) References Cited

U.S. PATENT DOCUMENTS 7,216,292 B1    5/2007   Snapper et al.
8,768,921 B2    7/2014   Ghosal et al.
(Continued)

FOREIGN PATENT DOCUMENTS

EP    2 595 105 A2    5/2013

OTHER PUBLICATIONS

International Search Report issued Feb. 28, 2023 in International Application No. PCT/US2022/049317.
(Continued)

*Primary Examiner* — Nicholas Ulrich
(74) *Attorney, Agent, or Firm* — Sughrue Mion, PLLC

(57) ABSTRACT

A method and system for automatically filling a form. The system includes at least one processor configured to: output a graphical user interface including the form; receive, from a first user, a user input to a predetermined initial user interface (UI) field, from among UI fields in the form; obtain, using a natural language processing model, a numerical representation of the user input; compare numerical representations respectively corresponding to previously filled forms and the obtained numerical representation of the user input; determine a previously filled form, among the previously filled forms, as having information content equal to or greater than a predetermined similarity threshold to the user input based on the comparing; obtain inputs for other UI fields, different from the predetermined initial UI field, based on corresponding inputs to the other UI fields in the determined previously filled form; and populate the other UI fields with the obtained inputs.

20 Claims, 12 Drawing Sheets

(51) Int. Cl.
G06F 40/40 (2020.01)
H04L 41/5074 (2022.01)

(56) References Cited

U.S. PATENT DOCUMENTS 10,198,698 B2 * 2/2019 Jayaraman ............ G06F 40/174
11,494,551 B1 * 11/2022 Espinas ................. G06N 20/00
2016/0275062 A1 * 9/2016 Xu ........................ G06F 3/0484
2022/0327583 A1 * 10/2022 Fotso .................... G06N 3/045

OTHER PUBLICATIONS

Written Opinion issued Feb. 28, 2023 in International Application No. PCT/US2022/049317.

* cited by examiner

≡ Ticket Center > Create Ticket > Basic Details | 🔍 Search Apps | Apps ⌄ | ⋯ 🔎 👤

○ Basic Details —— ○ Relation Mapping —— ○ Assemble Team

📇 Title*
COMMUNICATIONS NETWORK ISSUE

Manual

| Ticket Family* | Impact* | Urgency* | User Affected | Priority | ○ Smart Auto-Fill |
|---|---|---|---|---|---|

Event Start Date and Time*
0000-00-00

🗂 📊 📅

Interaction

| Mandatory Field 1* | | | Non-Mandatory Field 1 | | Non-Mandatory Field 2 |
|---|---|---|---|---|---|
| Enter text here | | | Enter text here | | Enter text here |
| Mandatory Field 2* | Mandatory Field 3* | | Mandatory Field 5* | | Non-Mandatory Field 4 |
| Enter text here | Enter text here | | Enter text here | | Enter text here |
| Non-Mandatory Field 3 | Mandatory Field 4* | | Non-Mandatory Field 7 | | Non-Mandatory Field 6 |
| Enter text here | Enter text here | | Enter text here | | Enter text here |
| Non-Mandatory Field 5 | Non-Mandatory Field 6 | | | | |
| Enter text here | Enter text here | | | | |

Cancel                                                                                     Next

FIG. 3

SYSTEM AND METHOD FOR AUTO FILLING FORM FIELDS BASED ON NATURAL LANGUAGE PROCESSING

CROSS REFERENCE TO RELATED APPLICATIONS

This application is a National Stage of International Application No. PCT/US2022/049317 filed on Nov. 8, 2022.

TECHNICAL FIELD

Systems and methods consistent with example embodiments of the present disclosure relate to the automatically filling forms based on natural language processing.

BACKGROUND

In the related art, in order to provide a meaningful level of detail to a form (i.e., to fill UI fields of the form with information) in a graphical user interface much time and effort is needed by a user (i.e., a first user). This time may cause delays which can cause a bottleneck in the processing flow of information in a computer system and further delays the processing of said information by another user (i.e., a second user).

For example, in the related art, among other use cases, forms may be used for resolving tickets. Furthermore, in the related art, the tickets may be used in root cause analysis (RCA) systems for discovering the source of incidents and resolving said incidents to eliminate such incidents from happening again. In order to manage the number of incidents, a related art RCA system includes ticket-based workflow management to handle the incidents (i.e., issues) as notified to a ticket resolver (e.g., a support team). To this end, a first user (i.e., a ticket creator) creates a ticket for a second user (i.e., the ticket resolver). In the related art, the first user inputs information to user interface (UI) fields of a form presented in a graphical user interface (GUI) to create a ticket. The ticket is created so that the second user can understand the issue and resolve it. Based on the user input in the UI fields of the form (i.e., the ticket content), the second user starts RCA and resolves the respective incident (i.e., prevents the same issue from recurring).

In the related art, in order to provide a meaningful (necessary) level of detail to the second user (i.e., the ticket resolver), the first user (i.e., the ticket creator) needs to provide extensive details about the issue. For example, to create a problem ticket a first user may need to manually input 13 mandatory UI fields and 19 non-mandatory UI fields to meet the information requirements for a ticket submission to the second user.

As a result, on one side, the first user (i.e., ticket creator) needs much time to provide details carefully and accurately for important (i.e., mandatory) fields to define and describe the issue to be handled by the second user (i.e., the ticket resolver). Any inaccurate or incorrect input can complicate the resolution of the issue and may lead to a delay thereof.

Moreover, in the case of high-priority tickets (i.e., tickets for system-critical incidents that need high-priority resolution), a first user (i.e., ticket creator) needs to react quickly, and a slow ticket creation process may cause a violation of a service level agreement (SLA).

On the other side, the ticket creator needs a profound knowledge of the issue (e.g., for an IT-related incident, etc.) to be analyzed. For example, the first user (i.e., ticket creator) may have to provide in-depth technical information to the second user (i.e., ticket resolver) which can cause the first user (i.e., ticket creator) to perform its own analysis (i.e., a pre-analysis) to understand the cause of the issue and formulate a detailed and accurate description of the issue. To this end, the first user (i.e., ticket creator) needs to be highly trained and aware of all process steps required to effectively resolve the ticket (i.e., to provide information that allows for an early resolution of the issue). Not all first users (i.e., ticket creators) have the high-level skills needed to formulate an effective description (i.e., create tickets with accurate information and an easily comprehensible description of the issue).

As a result, the second user (i.e., ticket resolver) may spend a lot of time and effort in trying to resolve an issue based on an ineffectively created ticket (i.e., a ticket that provides inaccurate, complicated, difficult to understand, etc. information content). This elaborate RCA process according to the related art is time-consuming, expensive, and highly vulnerable to human errors which can lead to frustration for highly skilled human resources on the ticket creator and ticket resolver side, respectively.

SUMMARY

According to embodiments, systems and methods are provided for automatically filling UI fields of forms in a GUI based on a minimum of information (i.e., predetermined UI field(s), from among UI fields in the form) provided by a first user to create a form (e.g., a problem ticket) which can be processed faster than a manually processed form by the first user. For example, the form can be faster and more easily processed by a second user. This minimizes the time and effort of the first user to process the form.

According to embodiments, in order to realize the auto-population (i.e., auto filling) of UI fields in a form as set forth above, the systems and methods for automatically filling the form (e.g., a ticket form for root cause analysis (RCA) and optimizing the resolution thereof) is based on natural language processing (NLP). Among many other use cases in industrial application and other domains, automatically filled forms for root cause analysis (RCA) and optimizing the resolution thereof is one example use case that has the advantage that a first user and a second user can process the input in UI fields faster.

According to embodiments, a system for automatically filling a form, the system including, a memory storing instructions, and at least one processor configured to execute the instructions to: output a graphical user interface including the form; receive, from a first user, a user input to at least one predetermined initial user interface (UI) field, from among UI fields in the form; obtain, using a natural language processing model, a numerical representation of the user input; compare numerical representations respectively corresponding to previously filled forms and the obtained numerical representation of the user input; determine at least one previously filled form, among the previously filled forms, as having information content equal to or greater than a predetermined similarity threshold to the user input based on the comparing; obtain inputs for other UI fields, different from the at least one predetermined initial UI field, based on corresponding inputs to the other UI fields in the determined at least one previously filled form; and populate the other UI fields of the form with the obtained inputs.

The form may be a form for creating a ticket, and the at least one processor is further configured to execute the instructions to: create the ticket based on the user input to the at least one predetermined initial UI field and the obtained inputs populated in the other UI fields.

The at least one processor may further configured to execute the instructions to: output a graphical user interface for a verification of the obtained inputs of the other UI fields; obtain a validation result based on the verification of the obtained inputs of the other UI fields; and based on obtaining the validation result, store the ticket and a numerical representation thereof in a ticket history folder as a reference.

The at least one processor may further configured to execute the instructions to: process the input for creating the numerical representation of the initial information, wherein the processing the input comprises performing at least one predetermined filtering of the input.

The at least one processor may further configured to execute the instructions to: compare numerical representations respectively corresponding to a predetermined subset of previously filled forms and the obtained numerical representation of the user input.

The at least one processor may further configured to execute the instructions to: determine a plurality of previously filled forms, the plurality of previously filled forms being a predetermined number or predetermined percentage of the previously filled forms with a highest similarity based on the comparing; and determine a most frequently-occurring input in a corresponding other UI field of the plurality of previously filled forms.

The at least one processor may further configured to execute the instructions to: obtain confirmed inputs of at least one UI field included in the created ticket; obtain, using the natural language processing model, a numerical representation of the confirmed inputs; compare numerical representations respectively corresponding to resolved tickets and the obtained numerical representation of the confirmed inputs; determine at least one resolved ticket, among the resolved tickets, as having information content equal to or greater than a predetermined similarity threshold to the confirmed inputs based on the comparing; obtain an input for another UI field, different from the at least one UI field, based on corresponding inputs to the other UI field in the determined at least one resolved ticket; populate the other UI field of the created ticket with the obtained input; and output the created ticket with the populated other UI field to a second user for verification of the obtained input for the other UI field.

The other field may be a field for describing a root cause or for describing a resolution for the root cause.

According to embodiments, a method for automatically filling a form, the method includes, outputting a graphical user interface including the form; receiving, from a first user, a user input to at least one predetermined initial user interface (UI) field, from among UI fields in the form; obtaining, using a natural language processing model, a numerical representation of the user input; comparing numerical representations respectively corresponding to previously filled forms and the obtained numerical representation of the user input; determining at least one previously filled form, among the previously filled forms, as having information content equal to or greater than a predetermined similarity threshold to the user input based on the comparing; obtaining inputs for other UI fields, different from the at least one predetermined initial UI field, based on corresponding inputs to the other UI fields in the determined at least one previously filled form; and populating the other UI fields of the form with the obtained inputs.

The form may be a form for creating a ticket, and the method may further includes creating the ticket based on the user input to the at least one predetermined initial UI field and the obtained inputs populated in the other UI fields.

The creating of the ticket may further include: outputting a graphical user interface for a verification of the obtained inputs of the other UI fields; obtaining a validation result based on the verification of the obtained inputs of the other UI fields; and based on obtaining the validation result, storing the ticket and a numerical representation thereof in a ticket history folder as a reference.

The method may further include: processing the input for creating the numerical representation of the initial information, wherein the processing the input comprises performing at least one predetermined filtering of the input.

The determining the at least one previously filled form may further include: comparing numerical representations respectively corresponding to a predetermined subset of previously filled forms and the obtained numerical representation of the user input.

The determining the at least one previously filled form may further include determining a plurality of previously filled forms, the plurality of previously filled forms being a predetermined number or predetermined percentage of the previously filled forms with a highest similarity based on the comparing; and the obtaining the inputs for the other UI fields comprises, for each of the other UI fields, determining a most frequently-occurring input in a corresponding other UI field of the plurality of previously filled forms.

The method may further include: obtaining confirmed inputs of at least one UI field included in the created ticket; obtaining, using the natural language processing model, a numerical representation of the confirmed inputs; comparing numerical representations respectively corresponding to resolved tickets and the obtained numerical representation of the confirmed inputs; determining at least one resolved ticket, among the resolved tickets, as having information content equal to or greater than a predetermined similarity threshold to the confirmed inputs based on the comparing; obtaining an input for another UI field, different from the at least one UI field, based on corresponding inputs to the other UI field in the determined at least one resolved ticket; populating the other UI field of the created ticket with the obtained input; and outputting the created ticket with the populated other UI field to a second user for verification of the obtained input for the other UI field.

The other field is a field for describing a root cause or for describing a resolution for the root cause. Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein:

FIG. 3 illustrates a graphical user interface comprising a form with UI fields according to one embodiment;

DETAILED DESCRIPTION

Figure 1:
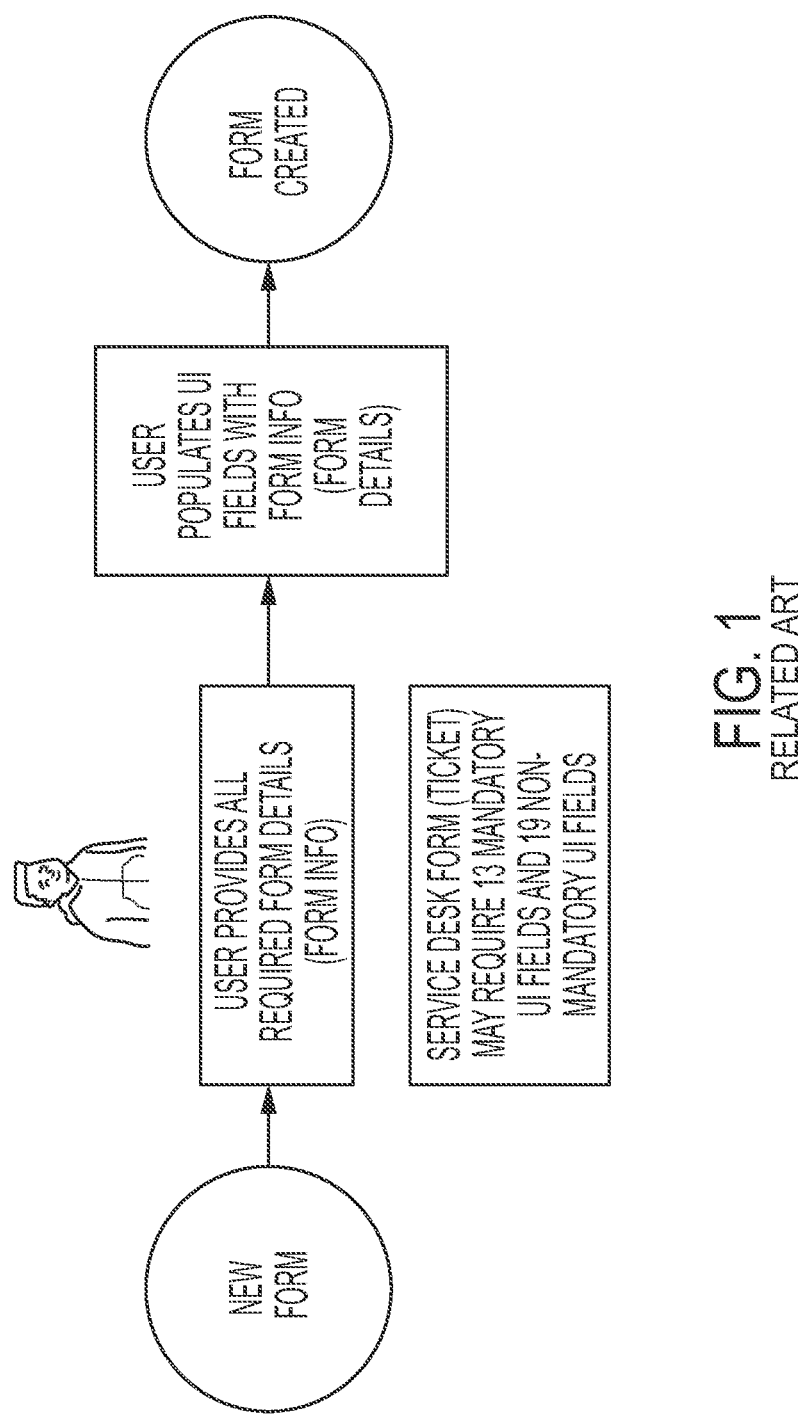
FIG. 1 illustrates a diagram of a process for filling a form according to the related art.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B. Example embodiments of the present disclosure provide a method and system in which for automatically populating tickets based on a minimum of information provided by a ticket creator to create a ticket which can be easily understood by a ticket resolver. The method and system, by utilizing natural language processing, minimizes the time and effort for the ticket creator, and optimizes the resolution of issues based on previously resolved tickets and automatically providing possible solutions to the ticket resolver.

FIG. 1 illustrates a diagram of a process for filling a form according to the related art. By way of example, the form may be a problem ticket created by a user and including at least one root cause analysis (RCA) field. It is understood, however, that other example embodiments are not limited thereto and may encompass other types of forms. Referring to FIG. 1, a first user collects all required information for filling a form (e.g., information for describing an issue relating to incident management, operational management, problem management, business management, etc.). For example, a problem ticket may require a first user to fill out (i.e., to manually input) 13 mandatory UI fields and 19 non-mandatory UI fields. Moreover, depending on the content of the issue, the first user may be required to perform a pre-analysis to formulate a description of the issue in the ticket that explains the issue accurately and makes it understandable to a second user. Once the first user has collected all necessary information, the first user manually fills the information in the according to UI fields (i.e., inputs the user inputs into the UI fields). Upon inputting all user inputs into the UI fields by the first user, the first user can submit the ticket. The ticket submission concludes the creation process of the ticket.

Figure 2:
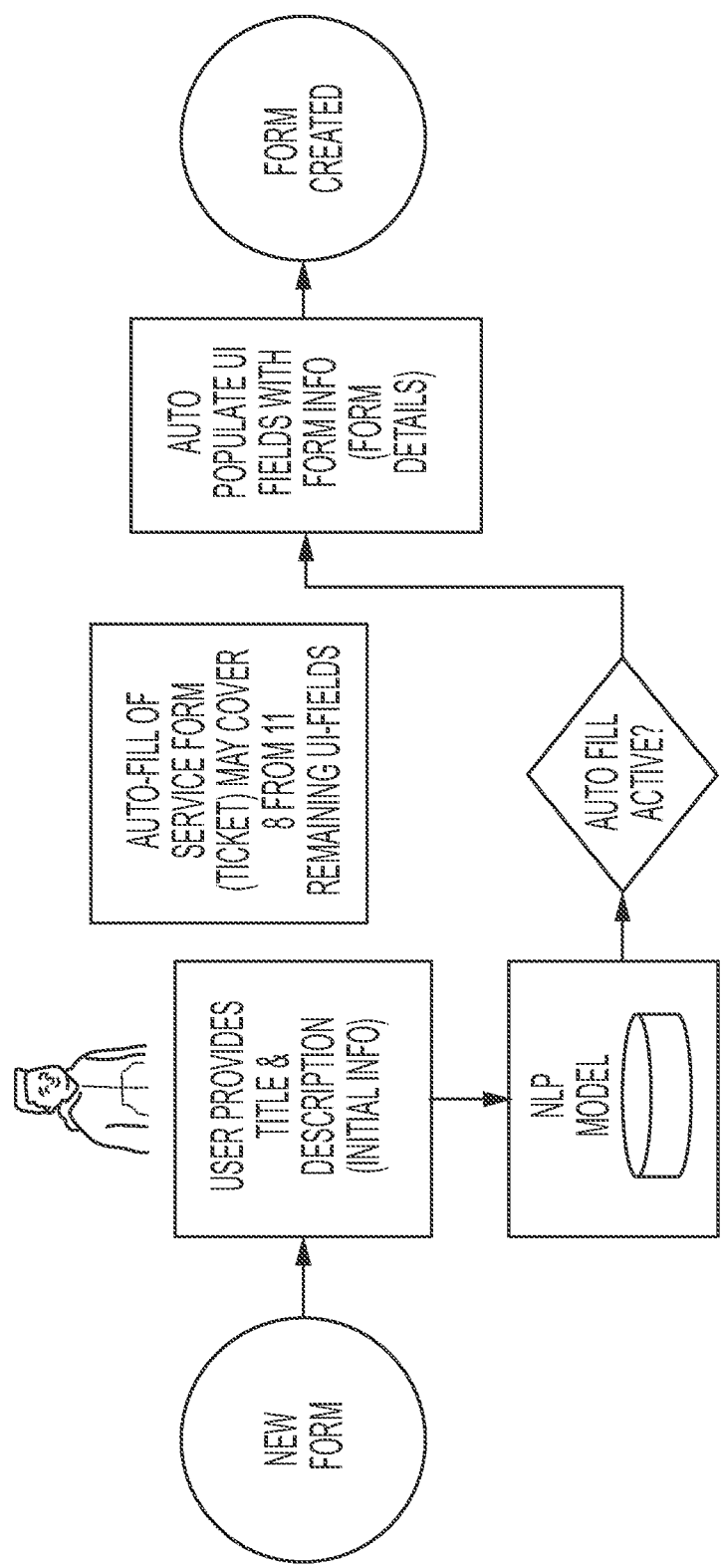
FIG. 2 illustrates a diagram of a process for auto filling a form according to one embodiment.

FIG. 2 illustrates a diagram of a process for auto filling a form according to one embodiment. Referring to FIG. 2, the first user inputs a user input to at least one predetermined initial UI field, from among UI fields in the form. For example, the predetermined initial UI field may correspond to a ticket title or ticket description UI field. Once the first user inputs the initial user input to the predetermined initial UI fields of the form (e.g., a form GUI), the computer system (e.g., RCA system) can determine and populate (i.e., automatically fill) other UI fields with user inputs obtained for user inputs of other UI fields, different from the at least one predetermined initial UI field, based on corresponding inputs to the other UI fields in the determined at least one previously filled form.

To this end, the computer system obtains a numerical representation of the user input to the at least one predetermined initial user interface (UI) field using a natural language processing model and compares the numerical representations respectively corresponding to previously filled forms and the obtained numerical representation of the user input. Based on the comparison the computer system determines at least one previously filled form, among the previously filled forms, as having information content equal to or greater than a predetermined similarity threshold to the user input.

In an example embodiment, the first user may verify the automatically filled content (i.e., the other input) in the UI fields. Once the UI fields of the form are populated, the form can be submitted, whereas the form submission concludes the creation process of the form.

In an example embodiment, in comparison to a service ticket of the related art, in the NLP-based auto population (i.e., automatically filling) of UI fields of the form as set forth above, based the user input to the at least one predetermined initial UI field, the computer system (e.g., RCA system) can auto-fill 8 from 11 UI fields of the form. This has the advantage that the filling of the form (e.g., creation of the ticket) is faster, more efficient, and more accurate than manually collecting and inputting information in the UI fields.

FIG. 3 illustrates a graphical user interface comprising a form with UI fields according to one embodiment. Referring to FIG. 3, the GUI includes multiple UI fields to request the first user to input information to the UI fields in a guided manner. For example, the UI fields may include input fields such as text fields, pull-down menus, etc., that allow (e.g., guide) the first user to directly input the requested information in the required UI fields. To this end, the form may only be submitted to the computer system (e.g., forwarded to a second user) if all required UI fields have been filled by the first user.

For example, to create a form such as a problem ticket, a first user may need to provide information for mandatory UI fields including at least one of a ticket priority, ticket title, ticket family, impact of the issue, the urgency of the issue, affected user by the issue, start date and time of the issue, ticket description (i.e., description of the issue that needs to be resolved), location of the entity with the issue (e.g., a domain of a virtual network service), category of the entity with the issue, information about entities which are affected by the issue, etc.

In addition to the mandatory UI fields, the graphical user interface may include a plurality of non-mandatory UI fields. The non-mandatory UI fields may be nested under the mandatory UI fields to engage with the first user to enter more detailed information about the issue in order to enrich the information content of the form to make the filling of the UI fields faster and the input to the UI fields easier understandable for the second user.

Furthermore, the graphic user interface includes an interactive button to activate the automatic filling (i.e., auto-population) of UI fields in the graphical user interface (i.e., an auto-fill button). The selection of this interactive button in the graphical interface may trigger a request to the computer system to start the process of automatically filling the UI fields of the form. If the auto-fill button is enabled, the automatic filling process is started upon receiving, from a first user, a user input to at least one predetermined initial UI field, from among UI fields in the form.

Figure 4:
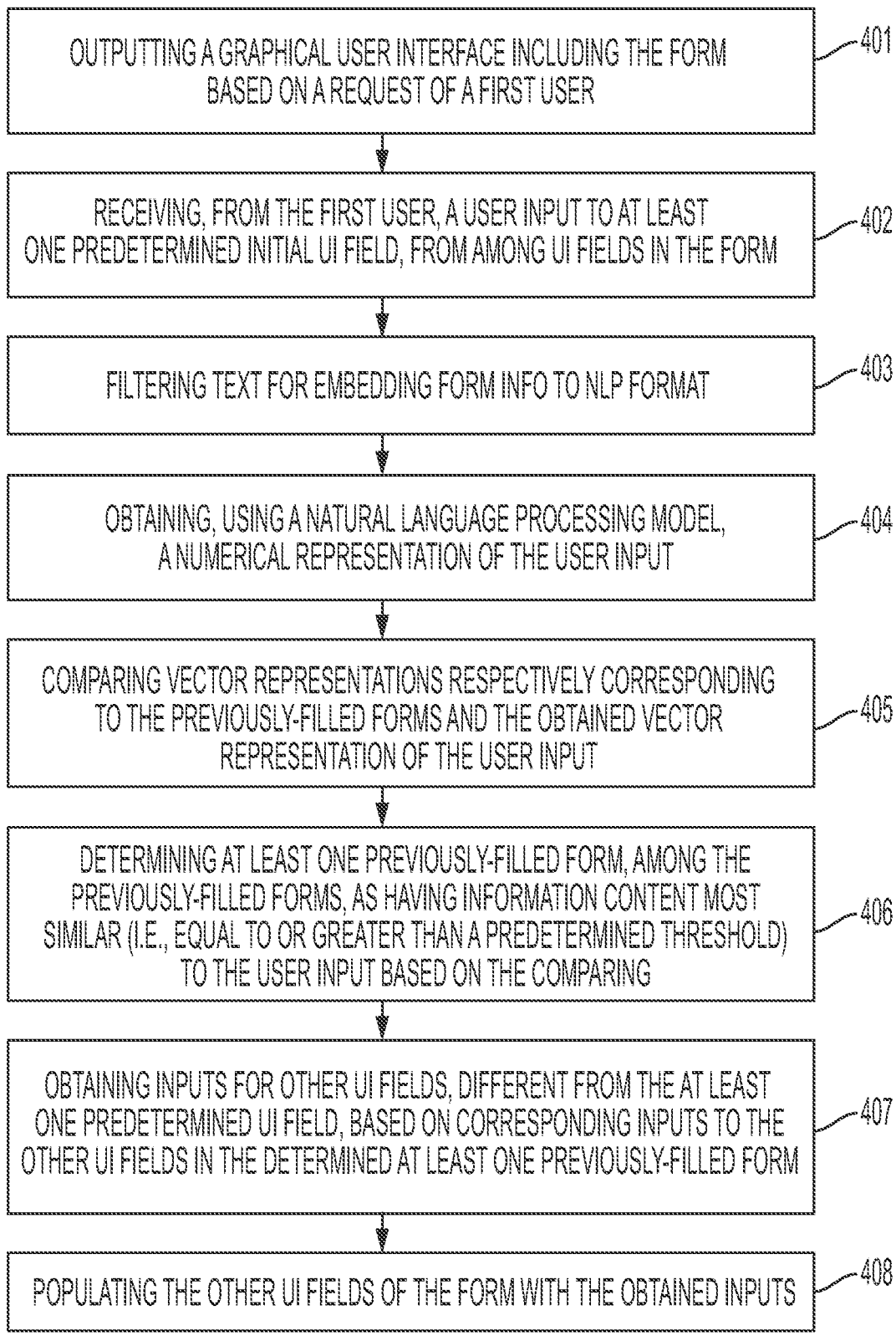
FIG. 4 illustrates a diagram of a process for automatically filling in UI fields of a form according to one embodiment.

FIG. 4 illustrates a flowchart of a method for automatically filling in UI fields of a form according to one embodiment. In order to create or fill a form, a first user may request a form (e.g., a form for a software-related issue in a telecommunications network), for example, from a landing page (e.g., a service desk portal, support portal, etc.) of a computer system (e.g., RCA system). Referring to FIG. 4, in step 401, the computer system outputs a graphical user interface that presents UI fields in the form. The form allows the first user to input a user input to at least one predetermined initial UI field, from among UI fields in the form (e.g., a ticket title, ticket description, etc.). The computer system may display the form on a user terminal (i.e., a user device similar to the device in FIG. 12). The first user can select the auto-fill button (e.g., starts the auto-fill process of the form) as set forth in FIG. 3. Based on the auto-fill button being selected and a user input in the at least one predetermined initial user interface (UI) field, the computer system activates the automatic filling of the other UI-fields of the form. Alternatively, the first user may input the user input in at least one predetermined initial UI field and subsequently activate the automatic filling via the auto-fill button. In an example embodiment, the graphical user interface may be similar to the graphical user interface in FIG. 3.

In step 402, the computer system obtains the user input to the at least one predetermined initial UI field, from among UI fields in the form. For example, the user input may be a text (e.g., words or a contextual text) input in the at least one predetermined initial UI field (e.g., a ticket title or a ticket description) by the first user.

In step 403, the computer system, in an example embodiment, may process the inputted text for creating a numerical representation (i.e., an NLP representation) of the user input to the at least one predetermined initial UI field, wherein the processing of the inputted text includes at least one predetermined filtering of the inputted text. For example, the text processing of the inputted text may include filtering of articles, verbs, adjectives, adverbs, etc. from the text (e.g., from the ticket title, ticket description, etc.). Alternatively, the text processing may include filtering of all punctuations or other symbols from the text. Moreover, the text processing may include the extraction of nouns and filtering of signal terms (e.g., technical terms, professional terms, etc.). The text processing may also be used to classify (i.e., categorize) the form to a predetermined subset of forms (e.g., classify a form or ticket type, a form or ticket category, technical field of the issue to which the form pertains or is being addressed by filling out the form, etc.).

In step 404, the computer system obtains the numerical representation of the user input using a natural language processing model. For example, the computer system may embed the processed text into a numerical representation (i.e., performs embedding of the processed text). For example, the numerical representation may be a representation of a text or at least one word. The text may be embedded in a vector representation of a natural language processing format based on a natural language processing model. Embedding (e.g., text embedding) is a method of extracting features out of the text so that said features can be input into a machine learning model (i.e., NLP model) to work with the text data.

Moreover, the numerical representation (e.g., vector representation) is a numeric vector that represents the text in a lower-dimensional space. It allows a text with a similar meaning to have a similar numerical representation. A numerical representation of text can also approximate the meaning of the text (e.g., words or context of a text). A text vector (i.e., numerical representation) may include 768 floating point values and thereby can represent 512 unique features of the text (e.g., the text can be associated with 512 features such as text alternatives, contextual meaning, etc.).

In an example embodiment, a "bidirectional encoder representations from transformers" (BERT) pre-trained transformer model may be used to apply the embedding of the processed text containing the initial information. BERT is an open-source machine learning framework for natural language processing. BERT is designed to help computers understand the meaning of ambiguous language in a text by using surrounding text to establish context.

In step 405, the computer system compares numerical representations respectively corresponding to previously filled forms and the obtained numerical representation of the user input of the form for the ticket to be created (e.g., the numerical representation of user input in predetermined initial UI fields of verified forms (e.g., resolved tickets stored in a database such as a ticket history repository and the obtained numerical representation of the user input of the form for the ticket to be created). Here, the comparison may be made to a subset of resolved or verified forms in the ticket history repository, e.g., a predetermined number or percentage of most recently closed or resolved tickets, or previously closed/resolved tickets within a predetermined time period (e.g., previous six months) or relative to a predetermined event (e.g., configuration change to a network). As a result, processing time may be reduced and computing resources may be conserved, and accuracy may improve (as the reference tickets that are more recent may have more accurate or relevant RCA or resolution). Further, according to an embodiment, the ticket history repository may only store a predetermined number or percentage of previously closed tickets or previously closed tickets of a predetermined time period (e.g., previous six months) and delete other closed tickets that do not satisfy this criteria. As a result, computing resources may be conserved.

According to an example embodiment, cosine similarity scoring may be used to compare the numerical representations of user input in predetermined initial UI fields of previously created tickets and the numerical representations of user input in predetermined initial UI fields of the ticket to be created. Cosine similarity measures the similarity between two numerical representations (i.e., vector representations) of a multi-dimensional space (e.g., an NLP formatted space of the NLP model). Cosine similarity is measured by the cosine of the angle between two vectors and determines whether two vectors are pointing in roughly the same direction. The more the vectors point in the same direction (i.e., align with each other), the more similar the text represented by the vectors.

In step 406, the computer system determines at least one previously filled form, among the previously filled forms, as having information content equal to or greater than a predetermined similarity threshold to the user input based on the comparison. For example, based on the cosine similarity measures obtained from the comparison in step 405, the computer system determines at least one form with similar information content (i.e., based on the highest scores of cosine similarity measures between the numerical representation of the predetermined UI fields of a previously filled form and the numerical representations of the predetermined initial UI fields of the ticket to be created). In an example embodiment, the computer system may obtain a predetermined number or predetermined percentage of most similar forms (e.g., the 10 most similar forms or 5% most similar forms from among all previously filled forms) based on the similarity measures or scores.

In step 407, the computer system obtains inputs for other UI fields, different from the at least one predetermined initial UI field, based on corresponding inputs to the other UI fields in the determined at least one previously filled form. For example, the computer system obtains inputs for other UI fields, different from the at least one predetermined initial UI field, based on corresponding inputs to the other UI fields in the determined at least one ticket with similar information content. In an example embodiment where the computer system obtains a predetermined number or percentage of most similar forms, the computer system may determine the most common inputs (i.e., the inputs that appear most) for the other UI fields from among the predetermined number or percentage of most similar forms.

In step 408, the computer system the other UI fields of the form with the obtained inputs. For example, the computer system automatically fills the remaining UI fields (i.e., the UI fields other than the predetermined initial UI fields) that are necessary to submit the form). Moreover, in step 408, in an example embodiment, the computer system creates the form based on the user input to the at least one predetermined initial UI field and the obtained inputs populated in the other UI fields. For example, the computer system creates the form based on the at least one predetermined initial UI field from the first user and the input of the other UI fields (i.e., the auto-filled input) obtained from the at least one previously filled form with similar information content.

In an example embodiment, the computer system may output a graphical user interface to allow a first user to verify the obtained inputs populated in the other UI fields (i.e., the input of the UI fields of the previously filled form of the created form before creating the form (e.g., before submitting the form).

Figure 5:
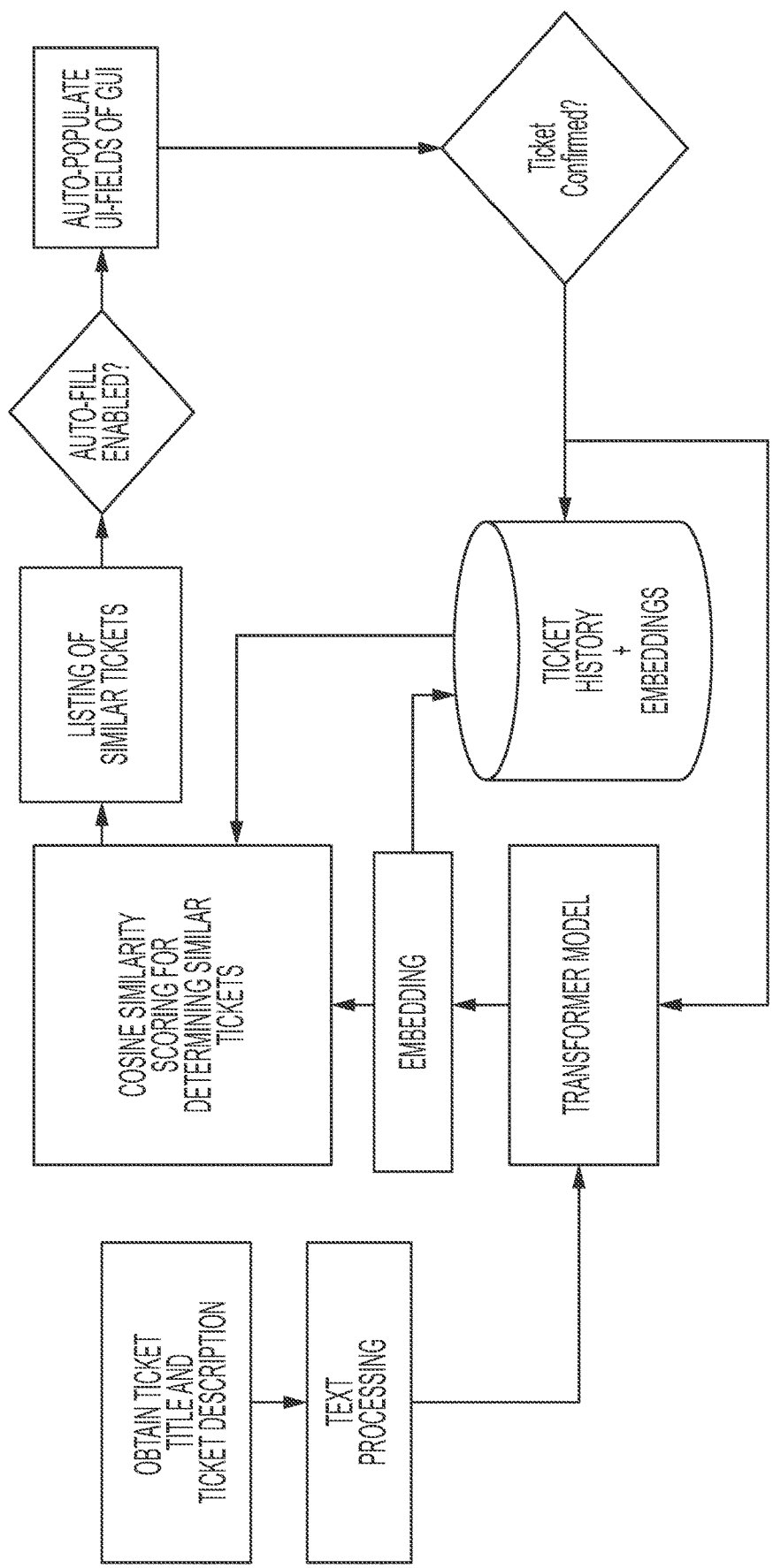
FIG. 5 illustrates a diagram of a process for automatically filling in UI fields of a form according to another embodiment.

FIG. 5 illustrates a diagram of a process for automatically filling in UI fields for a form according to another embodiment. Referring to FIG. 5, the form is used in an RCA system that obtains the inputted text of a ticket title and a ticket description from the ticket creator. The RCA system may process the obtained text before embedding the text into a numerical representation. For the embedding of the text, the RCA system uses a transformer model such as a BERT pre-trained transformer model. The numerical representation may include floating point values for embedding the text. The RCA system compares the numerical representation of the obtained text of the first user in the ticket to be created and the respectively corresponding numerical representations of the text of a plurality of previously filled tickets (e.g., the numerical representation of the ticket title and the ticket description in each of the plurality of previously filled tickets stored in the ticket history repository). The comparison of the numerical values is performed by cosine similarity scoring of the numerical representations.

If automatically filling is enabled (e.g., the first user may enable the automatic filling function by selecting the auto-fill button) and the RCA system received, from the first user, the user input to the at least one predetermined initial UI field, from among UI fields in the ticket to be created, the RCA system uses the obtained input for the automatic filling (i.e., populates) of the UI fields, different from the at least one predetermined initial UI field, based on corresponding inputs to the other UI fields in the determined at least one previously filled ticket. Once the UI fields of the form are filled a ticket can be created based on the user input to the at least one predetermined initial UI field and the obtained inputs populated in the other UI fields.

In an example embodiment, the RCA system outputs a graphical user interface for verification of the obtained inputs of the other UI fields and obtains a validation result based on the verification of the obtained inputs of the other UI fields. In this case, the RCA system stores the ticket and a numerical representation thereof in a ticket history folder as a reference (e.g., the RCA system stores the verified ticket in the ticket history repository and embeds the verified text of the UI fields in a numerical representation based on the transformer model, wherein the embedding is an array of floating point values, representing text, and stores the numerical representation in the ticket history repository).

Figure 6:
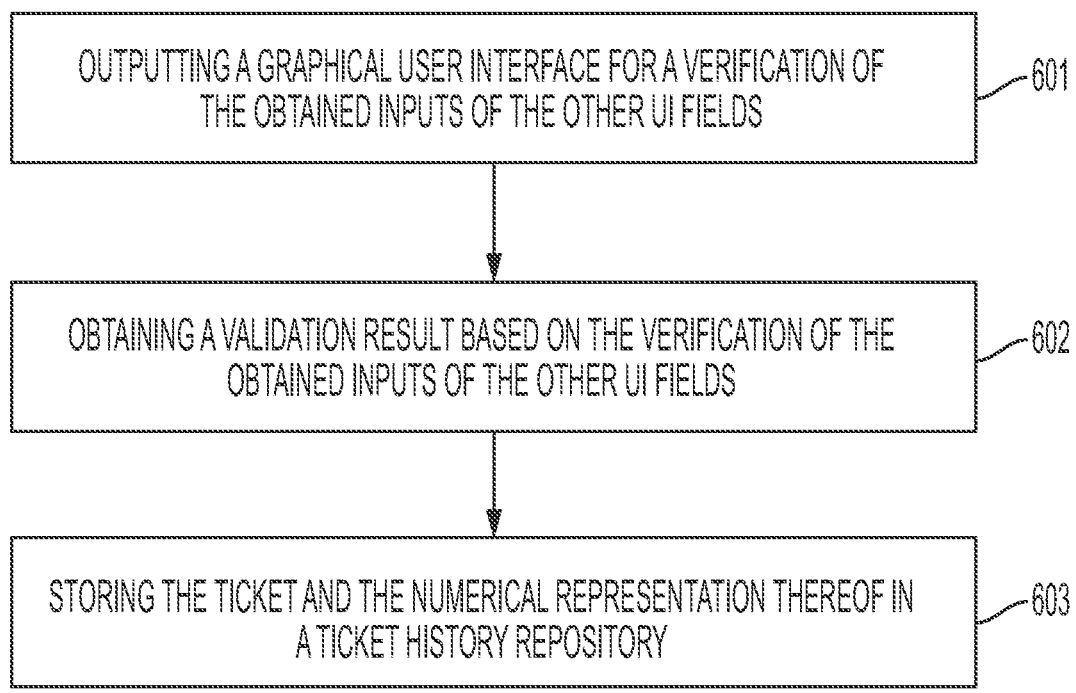
FIG. 6 illustrates a flowchart of a method verifying populated UI fields of a form according to one embodiment.

FIG. 6 illustrates a flowchart of a method for verifying populated UI fields in a form according to one embodiment. Referring to FIG. 6, in step 601, the computer system outputs a graphical user interface for verification of the obtained inputs of the other UI fields. For example, the computer system may output a graphical user interface that allows the first user to verify the created form set forth in FIG. 4.

In step 602, the computer system obtains a validation result based on the verification of the obtained inputs of the other UI fields (e.g., the validation result of the created ticket). In step 603, the computer system based on obtaining the validation result, stores the form and a numerical representation thereof in a form (e.g., ticket) history folder as a reference (e.g., stores the verified form (e.g., ticket) and the numerical representation thereof in the form (e.g., ticket) history repository).

Figure 7:
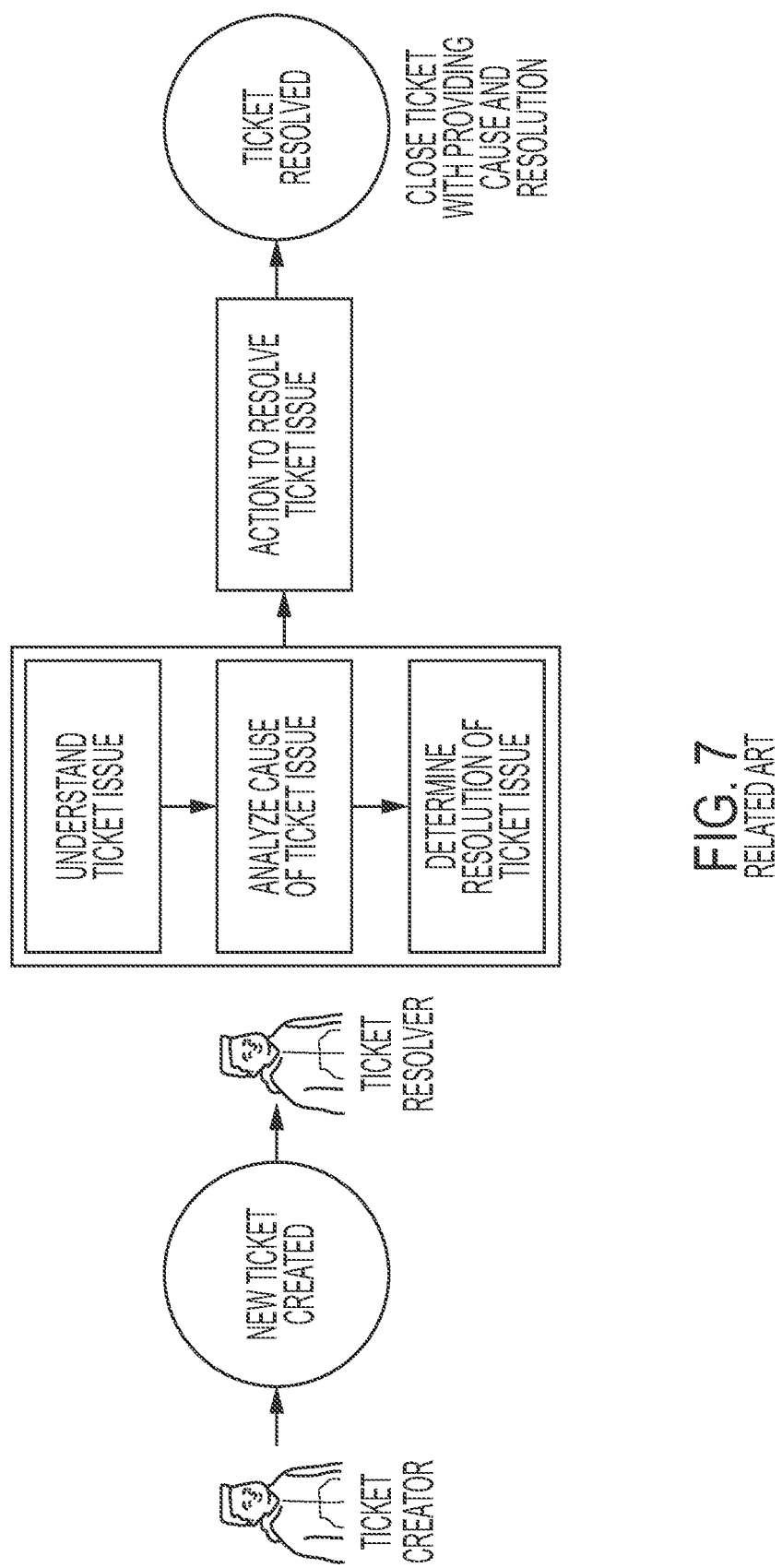
FIG. 7 illustrates a diagram of a process for resolving a ticket according to the related art.

FIG. 7 illustrates a diagram of a process for resolving a ticket according to the related art. Referring to FIG. 7, a related art RCA system transfers a newly created ticket from a first user (i.e., the ticket creator) to a second user (i.e., the ticket resolver). Based on the information provided in the ticket, the second user studies the ticket content to understand the issue, analyses the issue, and determines a solution to the issue (i.e., an issue resolution). Once a solution has been found, the second user takes action to resolve the issue and closes the ticket. Upon closing the ticket, the second user provides a closing notification of the (root) cause and the resolution to the first user. The related art process of FIG. 7 is time-consuming and prone to human error.

Figure 8:
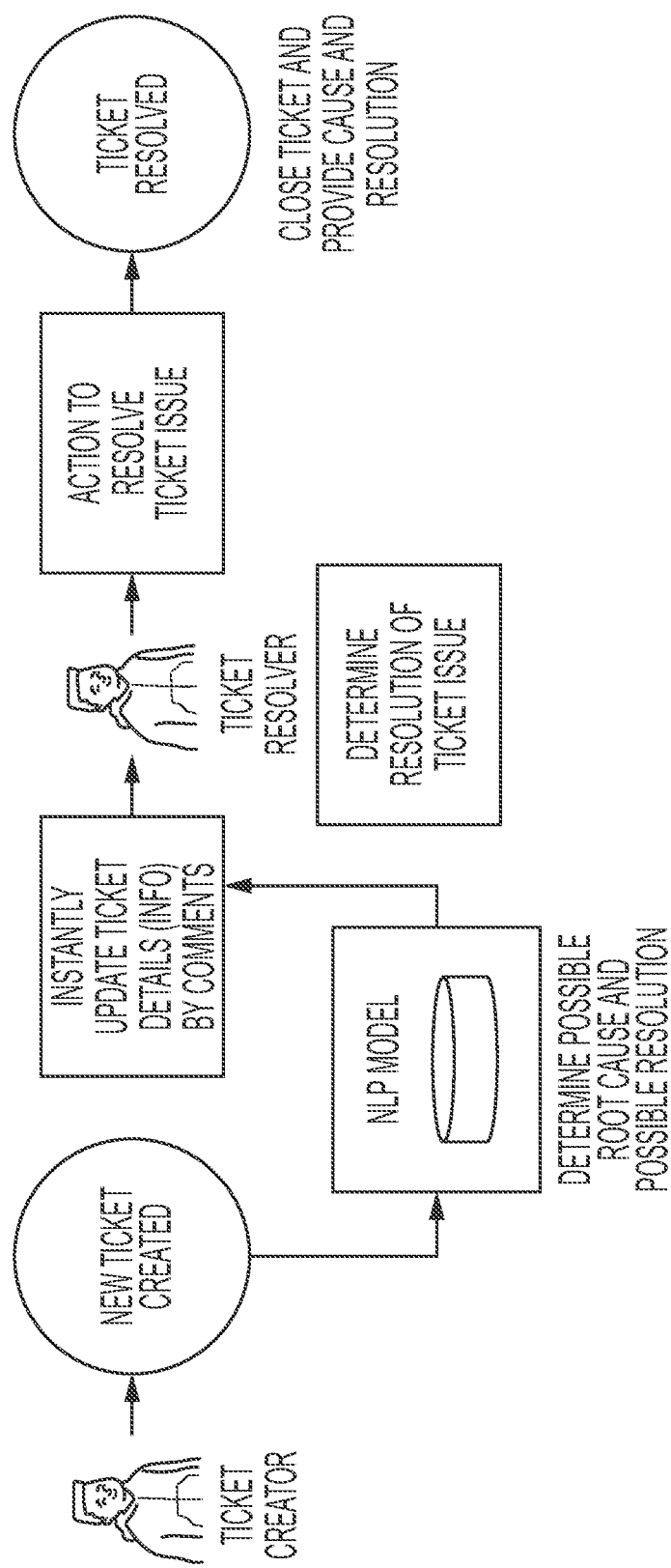
FIG. 8 illustrates a diagram of a process for resolving a ticket according to one embodiment.

FIG. 8 illustrates a diagram of a process for resolving a ticket according to one embodiment. Referring to FIG. 8, the RCA system obtains user input(s) (e.g., confirmed or verified inputs) to at least one UI field included in a created ticket (e.g., a ticket created or opened by a first user submitted to the RCA system).

The RCA system transfers the obtained input(s) to the UI fields of the created ticket and obtains a numerical representation of the confirmed inputs using the natural language processing model.

The RCA system compares the numerical representations respectively corresponding to resolved tickets and the obtained numerical representation of the confirmed inputs. Based on the comparison, the RCA system determines at least one resolved ticket, among the resolved tickets, as having information content equal to or greater than a predetermined similarity threshold to the confirmed inputs.

From the determined at least one resolved ticket, the RCA system obtains an input for another UI field, different from the at least one UI field, based on corresponding inputs to the other UI field in the determined at least one resolved ticket.

The RCA system then populates the other UI field (e.g., a description field) of the created ticket with the obtained input from the resolved ticket(s) and outputs the created ticket with the populated another UI field (e.g. at least one UI field other than UI fields that are manually input by a user) to a second user for verification of the obtained input for the other UI field, wherein the other field may be a field for describing a root cause and/or for describing a resolution for the root cause.

As a result, based on the field for describing a root cause or for describing a resolution for the root cause, the second user may resolve the ticket faster, more accurately, and with less effort.

Once the ticket issue has been resolved, the second user can close the ticket and the RCA system can send a notification regarding the closure of the ticket to the first user. The notification may include the determined root cause and the resolution of the ticket issue.

Figure 9:
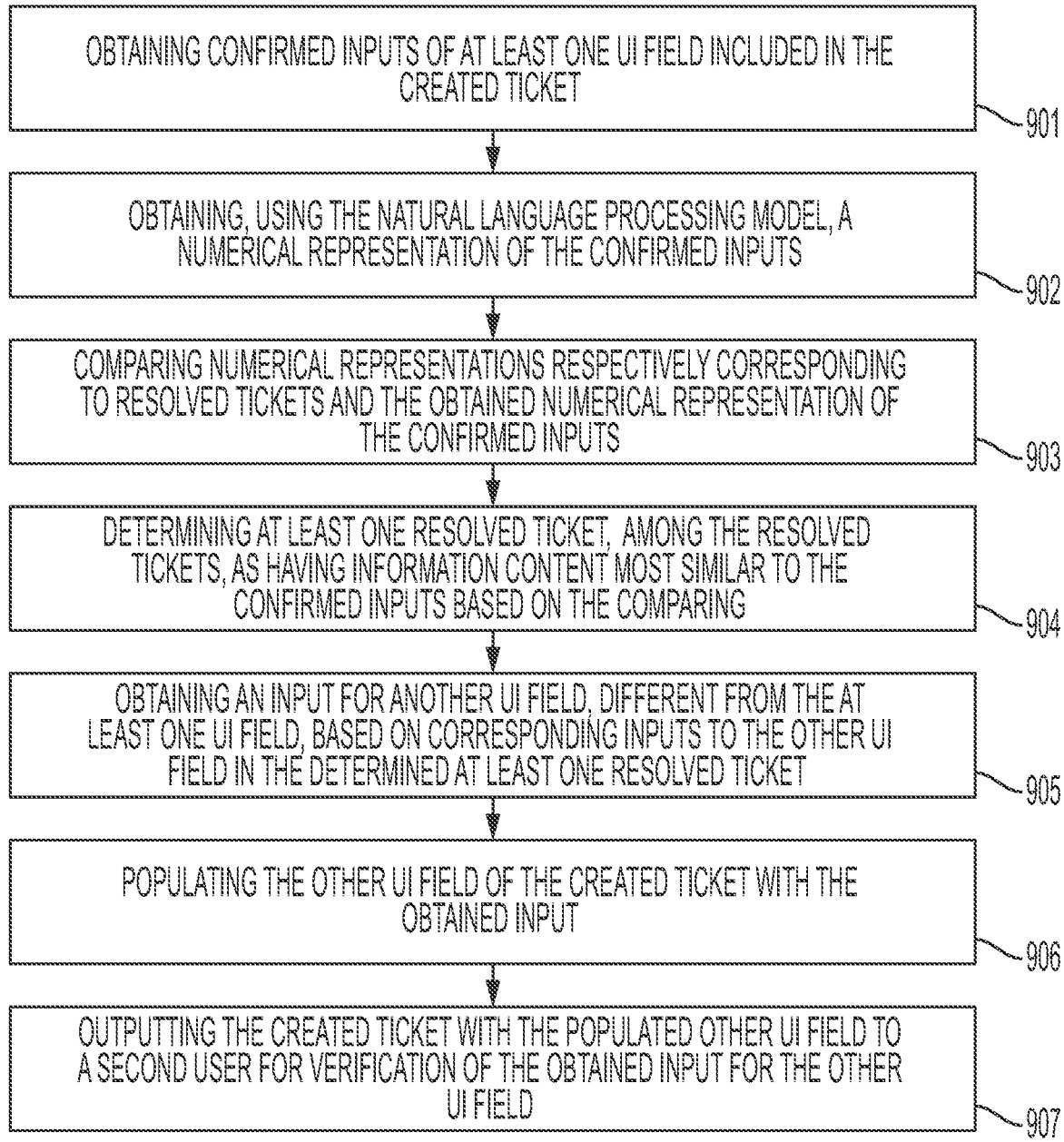
FIG. 9 illustrates the flowchart of a method for automatically filling UI fields of a form to resolve a created ticket according to one embodiment.

FIG. 9 illustrates the flowchart of a method for automatically filling UI fields of a form to resolve a created ticket according to one embodiment.

Referring to FIG. 9, in step 901, the RCA system obtains user inputs (e.g., confirmed inputs) to at least one UI field included in the created (or opened) ticket. For example, the user input(s) may be verified by the first user.

In step 902, the RCA system obtains the numerical representation of the inputs using the natural language processing model. For example, the NLP processing in step 902 may be similar to the NLP processing as set forth in step 404 of FIG. 4.

In step 903, the RCA system compares the numerical representations respectively corresponding to resolved tickets and the obtained numerical representation of the confirmed inputs. For example, the RCA system compares the numerical representations respectively corresponding to resolved tickets stored in the ticket history repository.

In step 904, the RCA system determines at least one resolved ticket, among the resolved tickets, as having information content equal to or greater than a predetermined similarity threshold (i.e., being the most similar in accordance to the cosine similarity analysis) to the confirmed inputs of UI fields based on the comparison. For example, the determination in step 904 may be similar to the determination of a previously filled form in step 406 of FIG. 4.

In step 905, the RCA system obtains an input for another UI field, different from the at least one UI field, based on corresponding inputs to the other UI field in the determined at least one resolved ticket. For example, the other input may be an input of a UI field for describing a root cause or for describing a resolution for the root cause.

In step 906, the RCA system populates the other UI field of the created ticket with the obtained input (e.g., automatically fills at least one UI field to update ticket details, for example, UI fields that describe the issue, a potentiation solution to the ticket, etc. which support the second user to resolve the ticket).

In step 907, the RCA system outputs the created ticket with the populated other UI field to a second user for verification of the obtained input for the other UI field, wherein the other UI field is a UI field for describing a root cause or for describing a resolution for the root cause. As a result, based on the comments outputted to the second user, the second user may resolve the ticket faster and with less effort.

Figure 10:
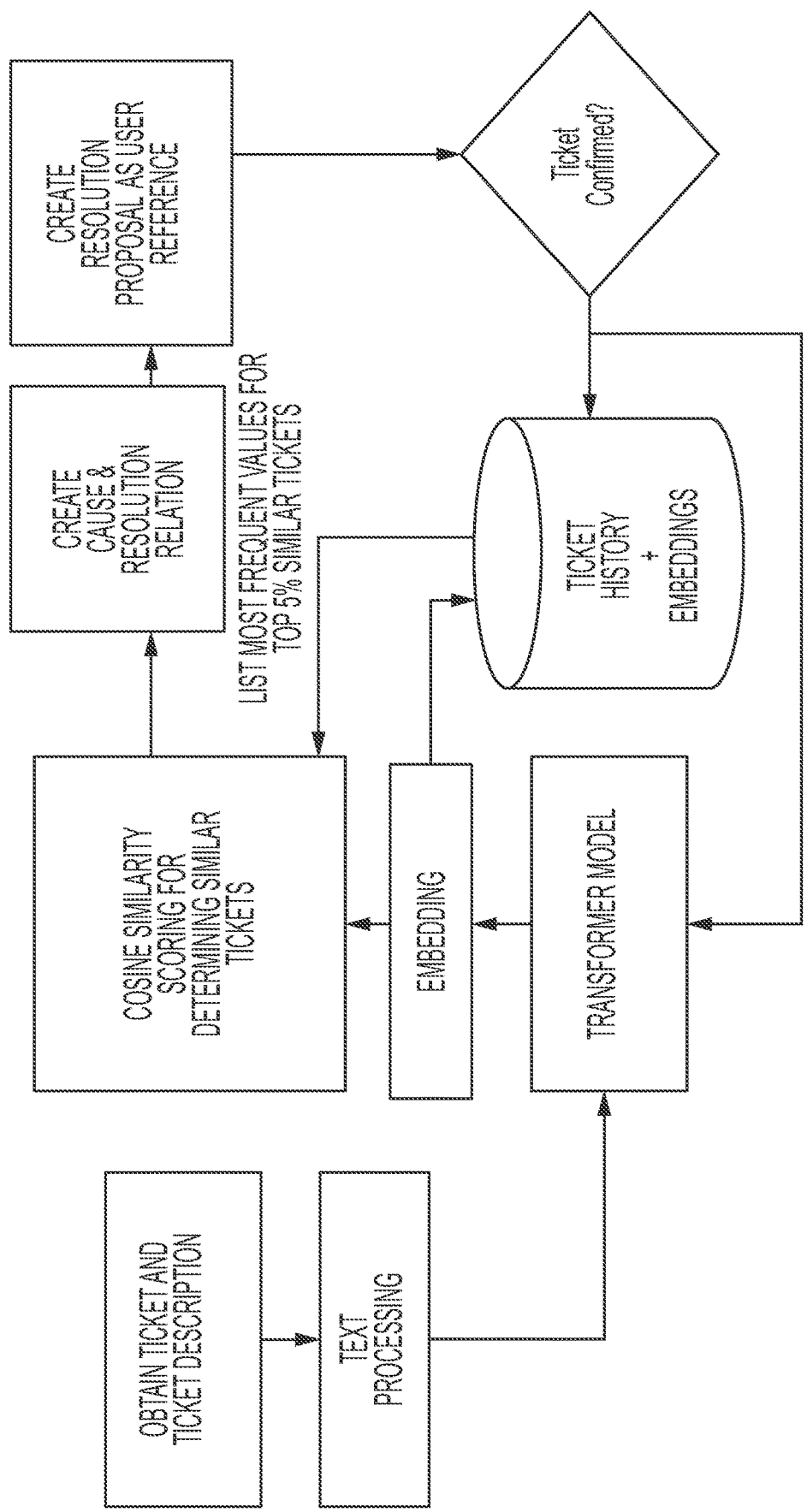
FIG. 10 illustrates a diagram of a process for automatically filling UI fields of a form to resolve a created ticket according to another embodiment.

FIG. 10 illustrates a diagram of a process for automatically filling UI fields for a form to resolve a created ticket according to one embodiment. Referring to FIG. 10, the RCA system obtains a ticket title and a ticket description of a newly generated ticket. It is understood that these UI fields are provided merely as an example, and one or more other embodiments are not limited thereto.

The RCA system may process the text of the ticket title and/or the ticket description before embedding the text to a numerical representation thereof. To this end, the RCA system uses a transformer model (i.e., an NLP model) such as a BERT pre-trained transformer model. The numerical representations may include floating point values for embedding the text. Once the text (e.g., the information content) of the created tickets is embedded, the RCA system compares the numerical representations of previously resolved tickets and the numerical representations of the information content (i.e., the text of the ticket title and/or ticket description) from the created ticket.

The RCA system uses cosine similarity scoring for the comparison of the corresponding numerical representations.

Based on the cosine similarity scoring of numerical representations, the RCA system determines at least one resolved ticket with similar information content.

Based on corresponding inputs to the other UI field in the determined at least one resolved ticket, the RCA system, for example, may obtain the input of the UI field for describing a root cause or for describing a solution to the root cause.

The RCA system then populates the UI field for describing a root cause or for describing a resolution for the root cause of the created ticket.

Subsequently, the RCA system outputs the created ticket with the UI field for describing a root cause or for describing a resolution for the root cause for verification of the obtained resolution for the root cause to the second user.

In an example embodiment, the computer system may obtain a predetermined number or predetermined percentage of most similar forms (e.g., the 10 most similar forms or 5% most similar forms from among all previously filled forms) based on the similarity measures or scores. In this case, the computer system may determine the most common inputs (i.e., the inputs that appear most often) for UI fields from among the predetermined number or percentage of most similar forms. As a result, the second user instantly obtains a potential or suggested resolution of the root cause from the RCA system. This allows the second user to resolve a ticket more efficiently and accurately (i.e., it allows the second user to understand and resolve the root cause of the ticket faster).

In another example embodiment, the RCA system outputs a graphical user interface for verification of the obtained inputs of the other UI fields. For example, the RCA system may output a graphical user interface to allow a second user to verify the obtained inputs populated in the other UI fields (i.e., the input of the UI fields of the previously filled form of the resolved ticket before resolving the ticket (e.g., before closing the ticket). In this case, the RCA system obtains a validation result based on the verification of the obtained inputs (e.g., among others the automatically filled UI fields of the created ticket (e.g., the validation result of the created ticket), and, based on obtaining the validation result, stores the ticket (e.g., resolved, verified ticket) and the numerical representation thereof in the ticket history folder as a reference (e.g., stores the verified or resolved ticket and the numerical representation thereof in the ticket history repository).

The verification of the obtained input of the UI field (e.g., the automatically filled input to the UI field has the advantage that the description of the root cause and the description of the solution of the root cause become more accurate and the automatic filling of the UI fields becomes more useful for the second user to resolve a ticket.

Figure 11:
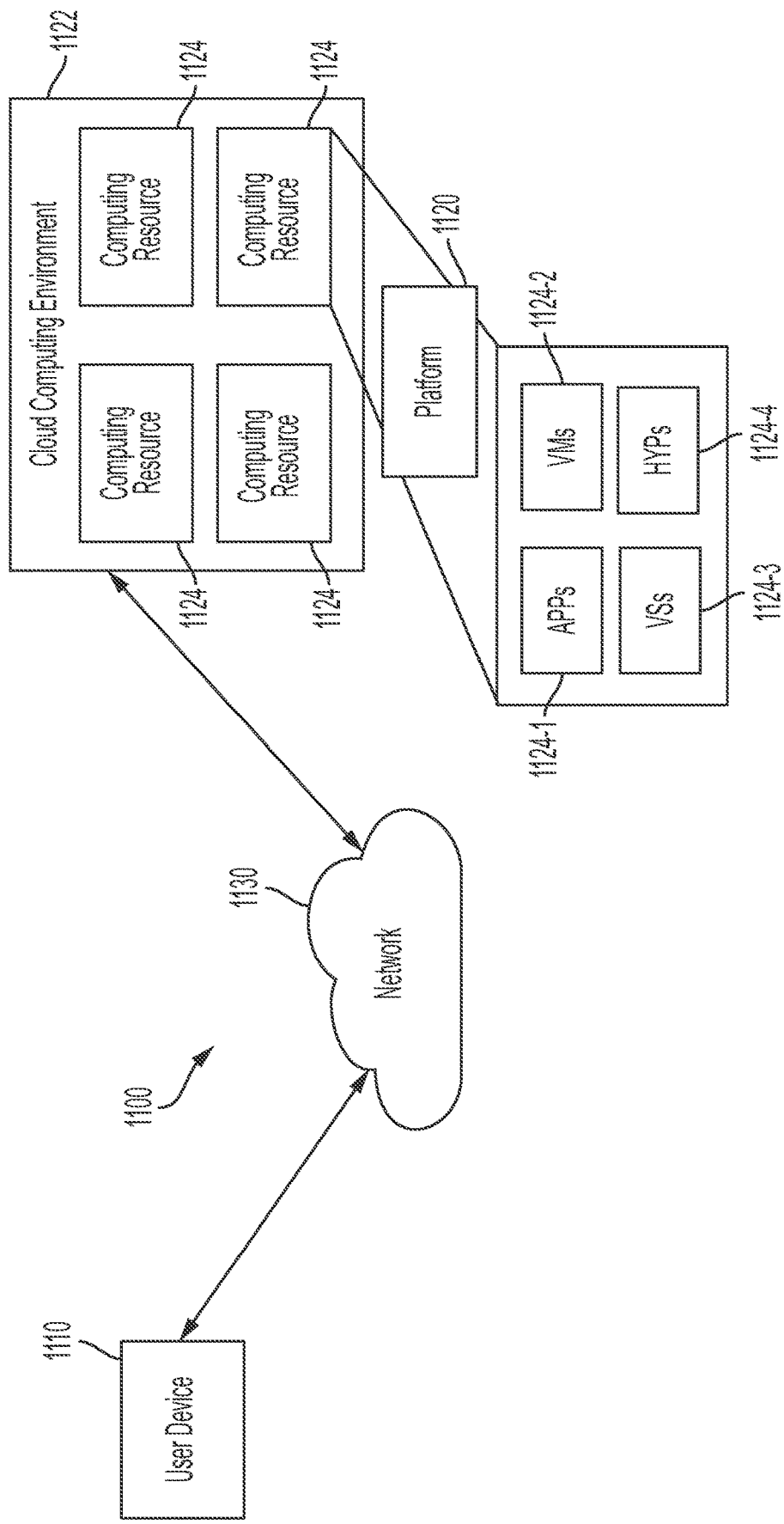
FIG. 11 is a diagram of an example environment in which systems and/or methods, described herein, may be implemented.

FIG. 11 is a diagram of an example environment 1100 in which systems and/or methods, described herein, may be implemented. As shown in FIG. 11, environment 1100 may include a user device 1110, a platform 1120, and a network 1130. Devices of environment 1100 may interconnect via wired connections, wireless connections, or a combination of wired and wireless connections. In embodiments, any of the functions and operations described with reference to FIG. 1 above may be performed by any combination of elements illustrated in FIG. 11.

User device 1110 includes one or more devices capable of receiving, generating, storing, processing, and/or providing information associated with platform 1120. For example, user device 1110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 1110 may receive information from and/or transmit information to platform 1120.

Platform 1120 includes one or more devices capable of receiving, generating, storing, processing, and/or providing information. In some implementations, platform 1120 may include a cloud server or a group of cloud servers. In some implementations, platform 1120 may be designed to be modular such that certain software components may be swapped in or out depending on a particular need. As such, platform 1120 may be easily and/or quickly reconfigured for different uses.

In some implementations, as shown, platform 1120 may be hosted in cloud computing environment 1122. Notably, while implementations described herein describe platform 1120 as being hosted in cloud computing environment 1122, in some implementations, platform 1120 may not be cloud-based (i.e., may be implemented outside of a cloud computing environment) or may be partially cloud-based.

Cloud computing environment 1122 includes an environment that hosts platform 1120. Cloud computing environment 1122 may provide computation, software, data access, storage, etc., services that do not require end-user (e.g., user device 1110) knowledge of a physical location and configuration of system(s) and/or device(s) that hosts platform 1120. As shown, cloud computing environment 1122 may include a group of computing resources 1124 (referred to collectively as "computing resources 1124" and individually as "computing resource 1124").

Computing resource 1124 includes one or more personal computers, a cluster of computing devices, workstation computers, server devices, or other types of computation and/or communication devices. In some implementations, computing resource 1124 may host platform 1120. The cloud resources may include compute instances executing in computing resource 1124, storage devices provided in computing resource 1124, data transfer devices provided by computing resource 1124, etc. In some implementations, computing resource 1124 may communicate with other computing resources 1124 via wired connections, wireless connections, or a combination of wired and wireless connections.

As further shown in FIG. 11, computing resource 1124 includes a group of cloud resources, such as one or more applications ("APPs") 1124-1, one or more virtual machines ("VMs") 1124-2, virtualized storage ("VSs") 1124-3, one or more hypervisors ("HYPs") 1124-4, or the like.

Application 1124-1 includes one or more software applications that may be provided to or accessed by user device 1110. Application 1124-1 may eliminate a need to install and execute the software applications on user device 1110. For example, application 1124-1 may include software associated with platform 1120 and/or any other software capable of being provided via cloud computing environment 1122. In some implementations, one application 1124-1 may send/receive information to/from one or more other applications 1124-1, via virtual machine 1124-2.

Virtual machine 1124-2 includes a software implementation of a machine (e.g., a computer) that executes programs like a physical machine. Virtual machine 1124-2 may be either a system virtual machine or a process virtual machine, depending upon use and degree of correspondence to any real machine by virtual machine 1124-2. A system virtual machine may provide a complete system platform that supports execution of a complete operating system ("OS").

A process virtual machine may execute a single program, and may support a single process. In some implementations, virtual machine 1124-2 may execute on behalf of a user (e.g., user device 1110), and may manage infrastructure of cloud computing environment 1122, such as data management, synchronization, or long-duration data transfers.

Virtualized storage 1124-3 includes one or more storage systems and/or one or more devices that use virtualization techniques within the storage systems or devices of computing resource 1124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 1124-4 may provide hardware virtualization techniques that allow multiple operating systems (e.g., "guest operating systems") to execute concurrently on a host computer, such as computing resource 1124. Hypervisor 1124-4 may present a virtual operating platform to the guest operating systems, and may manage the execution of the guest operating systems. Multiple instances of a variety of operating systems may share virtualized hardware resources.

Network 1130 includes one or more wired and/or wireless networks. For example, network 1130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 11 are provided as an example. In practice, there may be additional devices and/or networks, fewer devices and/or networks, different devices and/or networks, or differently arranged devices and/or networks than those shown in FIG. 11. Furthermore, two or more devices shown in FIG. 11 may be implemented within a single device, or a single device shown in FIG. 11 may be implemented as multiple, distributed devices. Additionally, or alternatively, a set of devices (e.g., one or more devices) of environment 1100 may perform one or more functions described as being performed by another set of devices of environment 1100.

Figure 12:
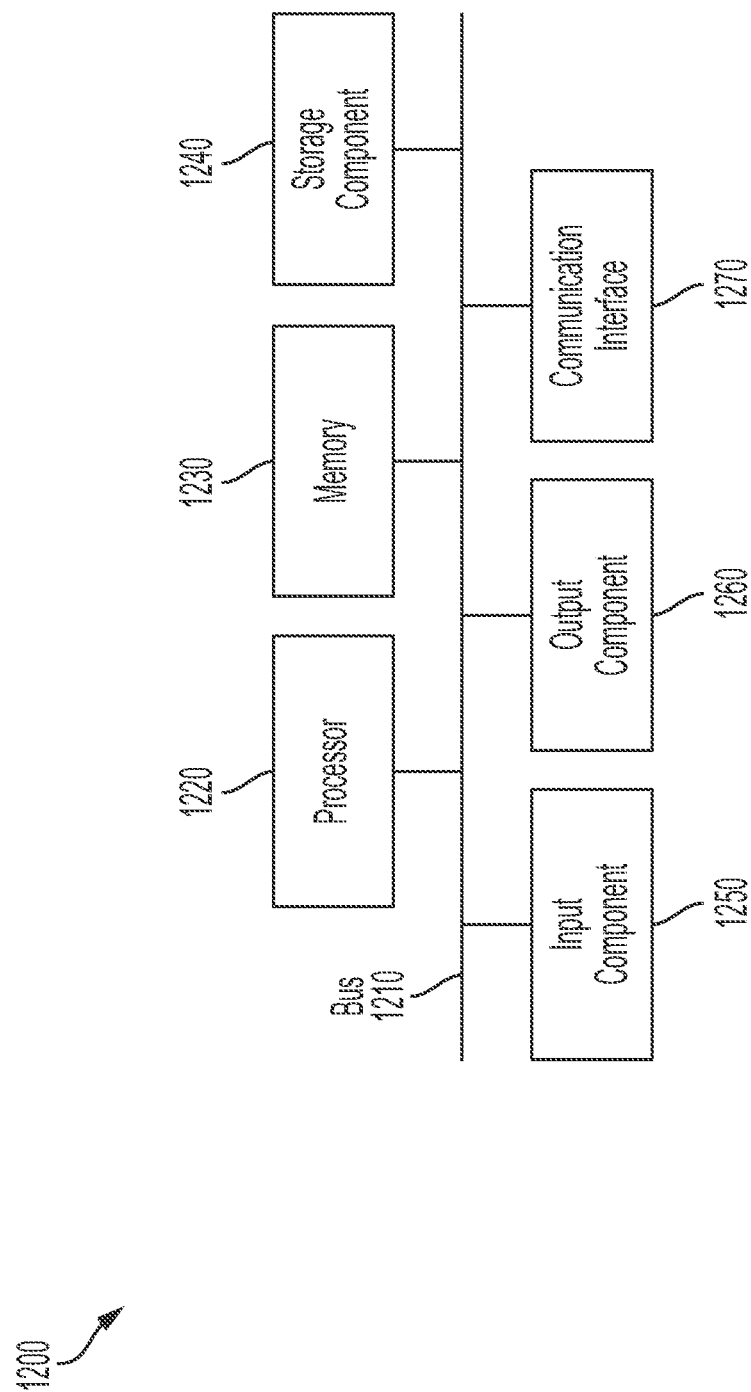
FIG. 12 is a diagram of example components of a device according to an embodiment.

FIG. 12 is a diagram of example components of a device 1200. Device 1200 may correspond to user device 1110 and/or platform 1120. As shown in FIG. 12, device 1200 may include a bus 1210, a processor 1220, a memory 1230, a storage component 1240, an input component 1250, an output component 1260, and a communication interface 1270.

Bus 1210 includes a component that permits communication among the components of device 1200. Processor 1220 may be implemented in hardware, firmware, or a combination of hardware and software. Processor 1220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 1220 includes one or more processors capable of being programmed to perform a function. Memory 1230 includes a random access memory (RAM), a read only memory (ROM), and/or another type of dynamic or static storage device (e.g., a flash memory, a magnetic memory, and/or an optical memory) that stores information and/or instructions for use by processor 1220.

Storage component 1240 stores information and/or software related to the operation and use of device 1200. For example, storage component 1240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 1250 includes a component that permits device 1200 to receive information, such as via user input (e.g., a touch screen display, a keyboard, a keypad, a mouse, a button, a switch, and/or a microphone). Additionally, or alternatively, input component 1250 may include a sensor for sensing information (e.g., a global positioning system (GPS) component, an accelerometer, a gyroscope, and/or an actuator). Output component 1260 includes a component that provides output information from device 1200 (e.g., a display, a speaker, and/or one or more light-emitting diodes (LEDs)).

Communication interface 1270 includes a transceiver-like component (e.g., a transceiver and/or a separate receiver and transmitter) that enables device 1200 to communicate with other devices, such as via a wired connection, a wireless connection, or a combination of wired and wireless connections. Communication interface 1270 may permit device 1200 to receive information from another device and/or provide information to another device. For example, communication interface 1270 may include an Ethernet interface, an optical interface, a coaxial interface, an infrared interface, a radio frequency (RF) interface, a universal serial bus (USB) interface, a Wi-Fi interface, a cellular network interface, or the like.

Device 1200 may perform one or more processes described herein. Device 1200 may perform these processes in response to processor 1220 executing software instructions stored by a non-transitory computer-readable medium, such as memory 1230 and/or storage component 1240. A computer-readable medium is defined herein as a non-transitory memory device. A memory device includes memory space within a single physical storage device or memory space spread across multiple physical storage devices.

Software instructions may be read into memory 1230 and/or storage component 1240 from another computer-readable medium or from another device via communication interface 1270. When executed, software instructions stored in memory 1230 and/or storage component 1240 may cause processor 1220 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 12 are provided as an example. In practice, device 1200 may include additional components, fewer components, different components, or differently arranged components than those shown in FIG. 12. Additionally, or alternatively, a set of components (e.g., one or more components) of device 1200 may perform one or more functions described as being performed by another set of components of device 1200.

In embodiments, any one of the operations or processes of FIGS. 1 through 10 may be implemented by or using any one of the elements illustrated in FIGS. 11 and 12.

As a result, the first user can create a ticket more efficiently, as the automatically determined and entered information prevents inaccurate or incorrect entry of information (e.g. due to human error) and the time required for manual entry is saved. On the other hand, the handling of requests is optimized as the time to understand, analyze and solve a problem is reduced.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A system for automatically filling a form, the system comprising:
    a memory storing instructions; and
    at least one processor configured to execute the instructions to:
        output a graphical user interface including the form;
        receive, from a first user, a user input to at least one predetermined initial user interface (UI) field, from among UI fields in the form;
        obtain, using a natural language processing model, a numerical representation of the user input;
        compare numerical representations respectively corresponding to previously filled forms and the obtained numerical representation of the user input;
        determine at least one previously filled form, among the previously filled forms, as having information content equal to or greater than a predetermined similarity threshold to the user input based on the comparing;
        obtain inputs for other UI fields, different from the at least one predetermined initial UI field, based on corresponding inputs to the other UI fields in the determined at least one previously filled form; and
        populate the other UI fields of the form with the obtained inputs.

2. The system as claimed in claim 1, wherein the form is a form for creating a ticket, and the at least one processor is further configured to execute the instructions to:
    create the ticket based on the user input to the at least one predetermined initial UI field and the obtained inputs populated in the other UI fields.

3. The system as claimed in claim 2, wherein the at least one processor is further configured to execute the instructions to:
    output a graphical user interface for a verification of the obtained inputs of the other UI fields;
    obtain a validation result based on the verification of the obtained inputs of the other UI fields; and
    based on obtaining the validation result, store the ticket and a numerical representation thereof in a ticket history folder as a reference.

4. The system as claimed in claim 1, wherein the at least one processor is further configured to execute the instructions to:
    process the input for creating the numerical representation of the initial information, wherein the processing the input comprises performing at least one predetermined filtering of the input.

5. The system as claimed in claim 1, wherein the at least one processor is further configured to execute the instructions to:
    compare numerical representations respectively corresponding to a predetermined subset of previously filled forms and the obtained numerical representation of the user input.

6. The system as claimed in claim 1, wherein the at least one processor is further configured to execute the instructions to:
    determine a plurality of previously filled forms, the plurality of previously filled forms being a predetermined number or predetermined percentage of the previously filled forms with a highest similarity based on the comparing; and
    determine a most frequently-occurring input in a corresponding other UI field of the plurality of previously filled forms.

7. The system as claimed in claim 3, wherein the at least one processor is further configured to execute the instructions to:
    obtain confirmed inputs of at least one UI field included in the created ticket;
    obtain, using the natural language processing model, a numerical representation of the confirmed inputs;
    compare numerical representations respectively corresponding to resolved tickets and the obtained numerical representation of the confirmed inputs;
    determine at least one resolved ticket, among the resolved tickets, as having information content equal to or greater than a predetermined similarity threshold to the confirmed inputs based on the comparing;
    obtain an input for another UI field, different from the at least one UI field, based on corresponding inputs to the other UI field in the determined at least one resolved ticket;
    populate the other UI field of the created ticket with the obtained input; and
    output the created ticket with the populated other UI field to a second user for verification of the obtained input for the other UI field.

8. The system as claimed in claim 7, wherein the other field is a field for describing a root cause or for describing a resolution for the root cause.

9. A method for automatically filling a form, the method comprising:
    outputting a graphical user interface including the form;
    receiving, from a first user, a user input to at least one predetermined initial user interface (UI) field, from among UI fields in the form;
    obtaining, using a natural language processing model, a numerical representation of the user input;
    comparing numerical representations respectively corresponding to previously filled forms and the obtained numerical representation of the user input;
    determining at least one previously filled form, among the previously filled forms, as having information content equal to or greater than a predetermined similarity threshold to the user input based on the comparing;

obtaining inputs for other UI fields, different from the at least one predetermined initial UI field, based on corresponding inputs to the other UI fields in the determined at least one previously filled form; and populating the other UI fields of the form with the obtained inputs.

10. The method as claimed in claim 9, wherein the form is a form for creating a ticket, and the method further comprises creating the ticket based on the user input to the at least one predetermined initial UI field and the obtained inputs populated in the other UI fields.

11. The method as claimed in claim 10, wherein the creating of the ticket comprises:

outputting a graphical user interface for a verification of the obtained inputs of the other UI fields;

obtaining a validation result based on the verification of the obtained inputs of the other UI fields; and based on obtaining the validation result, storing the ticket and a numerical representation thereof in a ticket history folder as a reference.

12. The method as claimed in claim 9, the method further comprising:

processing the input for creating the numerical representation of the initial information, wherein the processing the input comprises performing at least one predetermined filtering of the input.

13. The method as claimed in claim 9, wherein the determining the at least one previously filled form comprises:

comparing numerical representations respectively corresponding to a predetermined subset of previously filled forms and the obtained numerical representation of the user input.

14. The method as claimed in claim 9, wherein:

the determining the at least one previously filled form comprises determining a plurality of previously filled forms, the plurality of previously filled forms being a predetermined number or predetermined percentage of the previously filled forms with a highest similarity based on the comparing; and the obtaining the inputs for the other UI fields comprises, for each of the other UI fields, determining a most frequently-occurring input in a corresponding other UI field of the plurality of the previously filled forms.

15. The method as claimed in claim 11, further comprising:

obtaining confirmed inputs of at least one UI field included in the created ticket;

obtaining, using the natural language processing model, a numerical representation of the confirmed inputs;

comparing numerical representations respectively corresponding to resolved tickets and the obtained numerical representation of the confirmed inputs;

determining at least one resolved ticket, among the resolved tickets, as having information content equal to or greater than a predetermined similarity threshold to the confirmed inputs based on the comparing;

obtaining an input for another UI field, different from the at least one UI field, based on corresponding inputs to the other UI field in the determined at least one resolved ticket;

populating the other UI field of the created ticket with the obtained input; and outputting the created ticket with the populated other UI field to a second user for verification of the obtained input for the other UI field.

16. The method as claimed in claim 15, wherein the other field is a field for describing a root cause or for describing a resolution for the root cause.

17. A non-transitory computer-readable recording medium having recorded thereon instructions executable by at least one processor to perform a method for automatically filling a form, the method comprising:

outputting a graphical user interface including the form;

receiving, from a first user, a user input to at least one predetermined initial user interface (UI) field, from among UI fields in the form;

obtaining, using a natural language processing model, a numerical representation of the user input;

comparing numerical representations respectively corresponding to previously filled forms and the obtained numerical representation of the user input;

determining at least one previously filled form, among the previously filled forms, as having information content equal to or greater than a predetermined similarity threshold to the user input based on the comparing;

obtaining inputs for other UI fields, different from the at least one predetermined initial UI field, based on corresponding inputs to the other UI fields in the determined at least one previously filled form; and populating the other UI fields of the form with the obtained inputs.

18. The non-transitory computer-readable recording medium as claimed in claim 17, wherein the form is a form for creating a ticket, and the method further comprises creating the ticket based on the user input to the at least one predetermined initial UI field and the obtained inputs populated in the other UI fields.

19. The non-transitory computer-readable recording medium as claimed in claim 17, wherein the determining the at least one previously filled form comprises:

comparing numerical representations respectively corresponding to a predetermined subset of previously filled forms and the obtained numerical representation of the user input.

20. The non-transitory computer-readable recording medium as claimed in claim 17, wherein:

the determining the at least one previously filled form comprises determining a plurality of previously filled forms, the plurality of previously filled forms being a predetermined number or predetermined percentage of the previously filled forms with a highest similarity based on the comparing; and the obtaining the inputs for the other UI fields comprises, for each of the other UI fields, determining a most frequently-occurring input in a corresponding other UI field of the plurality of the previously filled forms.

* * * * *